United States Patent [19]

Herbert

[11] 4,334,736
[45] Jun. 15, 1982

[54] WET CORNEA MICROSCOPE

[76] Inventor: M. Linton Herbert, 762 E. Michigan Ave., #204, Orlando, Fla. 32806

[21] Appl. No.: 152,695

[22] Filed: May 23, 1980

[51] Int. Cl.³ .......................... G02B 3/12; G02B 21/00
[52] U.S. Cl. .......................................... 350/418; 350/8; 350/238
[58] Field of Search .................... 350/8, 418, 236, 237, 350/238

[56] References Cited

U.S. PATENT DOCUMENTS

| | | | |
|---|---|---|---|
| 52,672 | 2/1866 | Boyle | 350/8 |
| 3,409,349 | 11/1968 | Boyle et al. | 351/6 |

OTHER PUBLICATIONS

Drysdale, C. V., *Proc. of the Optical Convention*, 1905, Jun. 1905, pp. 126–128.

*Primary Examiner*—Jon W. Henry
*Attorney, Agent, or Firm*—Cahill, Sutton & Thomas

[57] ABSTRACT

A wet cornea microscope enables a viewer to see a substantially magnified image of a sample. The microscope includes a barrel having a hollow tubular interior and first and second ends. An objective lens is coupled to the first end of the barrel and is positionable in close proximity to the sample. An eyepiece forms a fluid-filled chamber and includes an optically transparent window which is positionable in alignment with the second end of the barrel. The cornea of one of the viewer's eyes is completely immersed in the fluid within the fluid-filled chamber. The contact of the fluid with the cornea of the viewer's eye effectively eliminates the refractive effect of the cornea/aqueous humor interface of the viewer's eye and permits the microscope to form a substantially magnified image of the sample on the retina of the viewer's eye.

21 Claims, 4 Drawing Figures

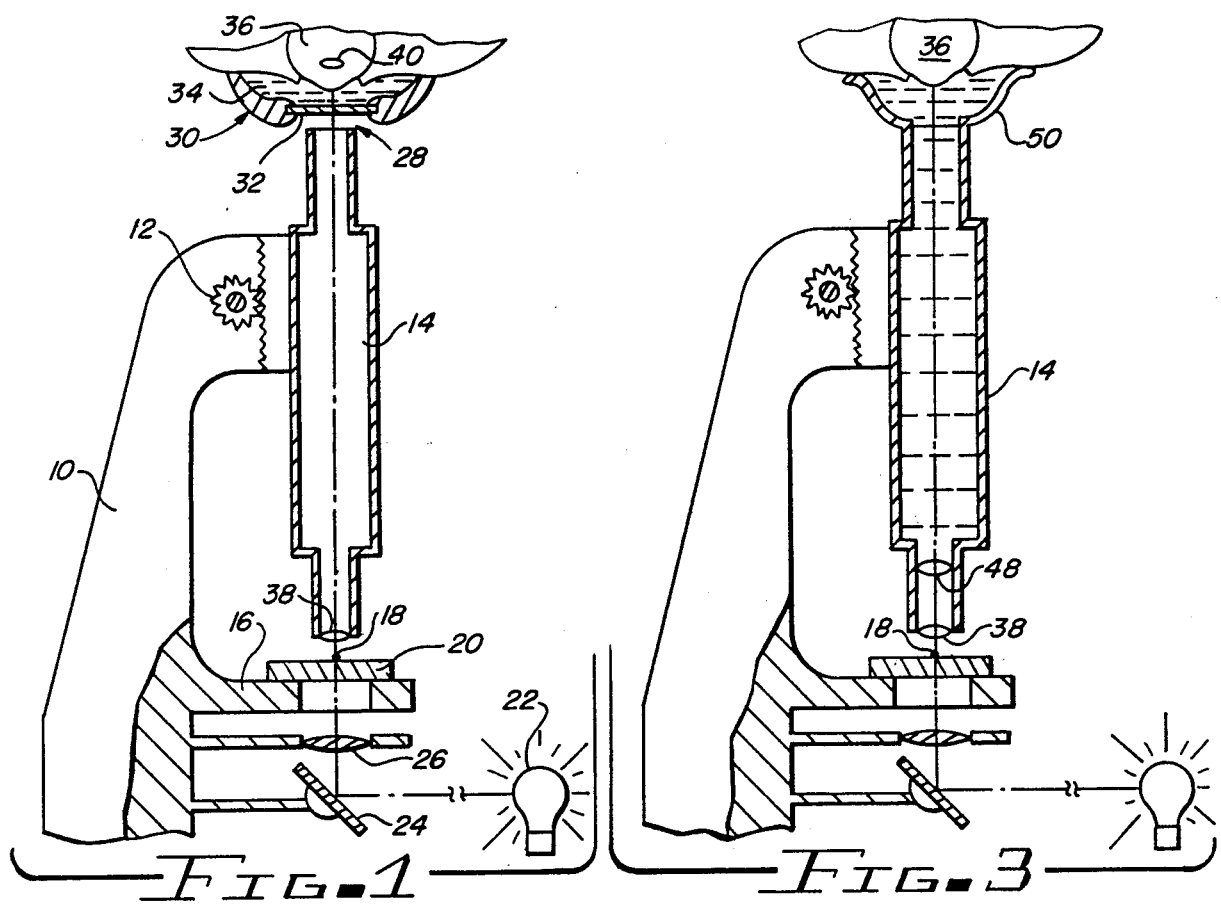
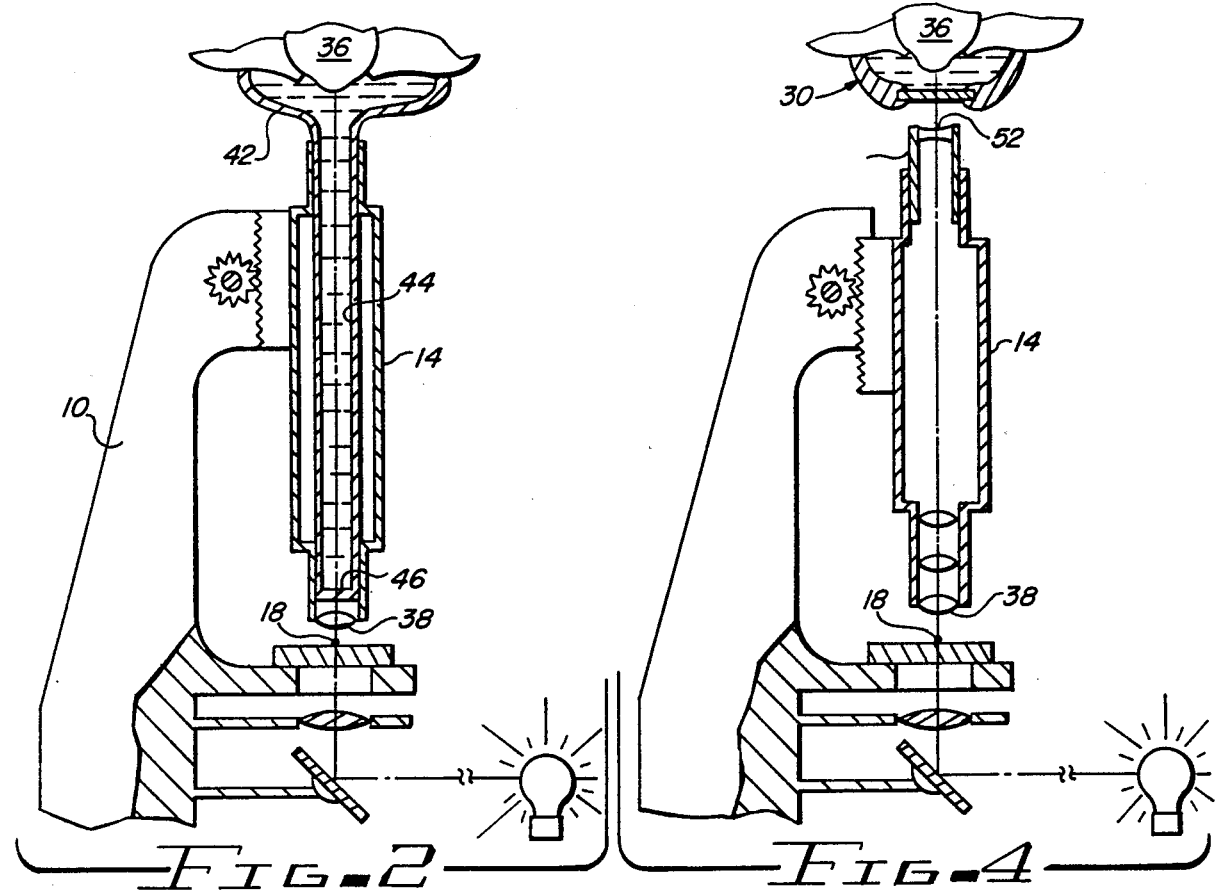

WET CORNEA MICROSCOPE

BACKGROUND OF THE INVENTION

1. Field of the Invention

This invention relates to microscopes, and more particularly to high power optical microscopes.

2. Description of the Prior Art

The prior art discloses numerous types of optical microscopes of various different designs well known to those skilled in the art. Prior art optical telescopes generally include a vertically displaceable microscope barrel having an objective lens or lens system on the lower end thereof and a positive lens coupled to an eyepiece which is positioned on the upper end of the microscope barrel. Various different magnification strengths are readily retainable by selecting an appropriate objective lens and an appropriate eyepiece.

U.S. Pat. No. 3,506,332 (Dewey) discloses an air to water viewing device including an elongated, water-tight tubular housing which prevents water from entering the housing and enables a viewer positioned above the water to view objects below the surface of the water. U.S. Pat. No. 1,299,750 (MacLachlan) discloses a combination telescope or opera glass which includes first and second spaced apart lenses.

SUMMARY OF THE INVENTION

It is therefore a principal object of my invention to provide an inexpensive, extremely high power optical microscope.

It is another object of my invention to provide an optical microscope which is quite simple, yet highly reliable and accurate in operation.

It is yet another object of my invention to provide a microscope which immerses the cornea of a viewer's eye in a fluid having an index of refraction comparable to the index of refraction of the transparent fluid contained within the aqueous humor of the viewer's eye to thereby eliminate the refractive effect of the cornea/aqueous humor interface of the viewer's eye.

Briefly stated, and in accord with one embodiment of the invention, a wet cornea microscope enables a viewer to see a substantially magnified image of a sample. This microscope comprises a microscope barrel having a hollow tubular interior and first and second ends. An objective lens is coupled to the first end of the barrel and is positionable in close proximity to the sample. Fluid-filled chamber means includes an optically transparent window which is positionable in alignment with the second end of the barrel to form an optically transparent fluid-filled chamber between the window and the cornea of one of the viewer's eyes. The fluid-filled chamber means effectively eliminates the refractive effect of the cornea/aqueous humor interface in the viewer's eye and permits the microscope to form a substantially magnified image of the sample on the retina of the viewer's eye.

DESCRIPTION OF THE DRAWINGS

The invention is pointed out with particularity in the appended claims. However, other objects and advantages together with the operation of the invention may be better understood by reference to the following detailed description taken in connection with the following illustrations wherein:

FIG. 1 is a sectional view of one comparatively basic embodiment of the wet cornea microscope of the present invention.

FIG. 2 is a sectional view illustrating a second embodiment of the wet cornea microscope which includes an eyepiece having a vertically oriented hollow tubular barrel.

FIG. 3 is a sectional view illustrating a third embodiment of the present invention in which the microscope barrel is filled with fluid.

FIG. 4 illustrates another embodiment of the present invention in which a negative lens is coupled to the upper end of the microscope barrel.

DESCRIPTION OF THE PREFERRED EMBODIMENT

In order to better illustrate the advantages of the invention and its contributions to the art, several preferred hardware embodiments of the invention will now be described in some detail.

FIG. 1 illustrates one of the most basic embodiments of the wet cornea microscope of the present invention which can be manufactured from a commercially available microscope. This embodiment includes a frame 10 having a focus control 12 for vertically displacing the barrel 14 of the microscope with respect to the microscope stage 16. The sample 18 to be studied is positioned on a transparent glass slide 20.

Various types of illuminating means such as an electric lamp 22 provide a source of illumination which is reflected by mirror 24 through condensing lens 26 onto sample 18.

Typical commercially available optical microscopes have an eyepiece containing a positive or convex lens coupled to the second end of barrel 14 at the point indicated by reference number 28. In the FIG. 1 embodiment of the wet cornea microscope, however, the eyepiece and positive lens have been removed. Instead, a fluid-filled chamber means in the form of an eyepiece 30 is coupled to one of the viewer's eyes as illustrated. Eyepiece 30 includes a flat, optically transparent window 32. The interior of eyepiece 30 is filled with a transparent fluid such as de-ionized water.

The human eye normally produces a substantial refractive effect as a result of the difference in the index of refraction between air and the index of refraction of the aqueous humor of the human eye which is approximately equal to 1.336. Since the interior and exterior surfaces of the cornea are essentially parallel, the cornea itself has virtually no refractive effect on light rays transmitted through the cornea into the aqueous humor. In the present invention, it is desired to eliminate the refractive effect of the air/cornea/aqueous humor interface of the viewer's eye for reasons which will be explained below. Flat, optically transparent window 32 includes parallel upper and lower surfaces and therefore has no refractive effect on light rays transmitted through microscope barrel 14 into the interior of fluid-filled cavity 34.

In order to equalize the index of refraction of the fluid within cavity 34 and the index of refraction of the aqueous humor 36, a two and one half percent saline solution or a five percent sugar solution is utilized. Pure distilled or deionized water can be placed within cavity 34, but the overall magnification of the wet cornea microscope will be somewhat reduced. It is preferable to use the five percent sugar solution since this solution is less irritating than the saline solution and since the sugar dissolved in this solution provides nourishment to the corneal surface of the eye. The user of the present invention is thus able to tolerate having the sugar solution in contact with the corneal surface of the eye for a substantially longer time than would be the case with either pure de-ionized water or the saline solution.

The magnification of all optical microscopes, including the device illustrated in FIG. 1, is proportional to the ratio of the distance between the positive objective lens 38 positioned at the first or lower end of barrel 14 and the retina in the rear portion of aqueous humor 36 and the distance between sample 18 and objective lens 38. Removing the conventional eyepiece having a positive lens from the upper end of microscope barrel 14 and incorporating the fluid-filled chamber means described above causes two desirable effects: 1. in order to maintain proper focus, the distance between sample 18 and objective lens 38 must be decreased; 2. the distance between objective lens 38 and the retina of the human eyeball must be increased by having the viewer physically elevate his head to a position above that previously required when the commercially available eyepiece was utilized. Lens 40 within the viewer's eye will still have some small refractive effect, but the overall magnification of the wet cornea microscope can be substantially increased over the magnification obtainable from the same instrument incorporating its standard eyepiece.

Referring now to FIG. 2, a substantially modified eyepiece 42 is illustrated. Eyepiece 42 includes a long, vertically descending barrel 44 which includes an outer diameter slightly less than the inner diameter of microscope barrel 14. The lower end of eyepiece 42 includes a flat, optically transparent window 46 positioned in close proximity to objective lens 38. The upper end of eyepiece 42 includes a substantially enlarged diameter section fabricated from a soft plastic or an equivalent elastomerica material which enables a water tight seal to be formed between eyepiece 32 and the tissue surrounding the eye of the wearer. The interior of eyepiece 42 is completely filled with an optically transparent fluid of a type described above. The embodiment illustrated in FIG. 2 operates in substantially the same manner as the wet cornea microscope described in connection with FIG. 1 above. Eyepiece 42 of this embodiment remains attached to the microscope itself and may be more convenient to use in certain applications. The comparatively small spacing between objective lens 38 and window 46 substantially reduces any distortion which may be caused by optical irregularities in window 46.

Referring now to FIG. 3, yet another embodiment of the wet cornea microscope of the present invention is illustrated. In this embodiment, a second objective lens 48 is incorporated within microscope barrel 14 as is standard practice in sophisticated optical microscopes. The FIG. 3 embodiment can be fabricated with either a single objective lens 38 or with the two objective lenses as shown. Objective lens 48 must be tightly sealed to the interior of microscope barrel 14 so that the transparent fluid within the interior of barrel 14 does not leak past objective lens 48. The index of refraction of the fluid within microscope barrel 14 must be approximately equal to 1.336. A resilient eyepiece 50 fabricated from soft plastic or an equivalent elastomeric material is coupled to the upper end of barrel 14 as illustrated. Eyepiece 50 forms a water tight seal with the tissue surrounding the viewer's eye.

In the FIG. 2 embodiment, the utilization of a watertight eyepiece 42 permits a commercially available microscope to be readily modified and used as a wet cornea microscope. In the FIG. 3 embodiment, however, microscope barrel 14 and any objective lens elements therein must be specially treated or manufactured to be waterproof. In the FIG. 3 embodiment, it is not necessary to provide an optically transparent window since objective lens 48 directly interfaces with the fluid within the interior of microscope barrel 14. As mentioned above, a second objective lens 48 is illustrated since some commercially available microscopes are manufactured with more than one such lens. In a simpler microscope, lens 48 would be omitted and a single objective lens would be coupled to the lower end of microscope barrel 14 with a watertight seal.

Referring now to FIG. 4, yet another embodiment of the present invention is illustrated. The structure and function of eyepiece 30 is virtually the same as is disclosed in connection with FIG. 1 above. In the FIG. 4 embodiment, a negative lens 52 is added to the upper or second end of microscope barrel 14. The addition of negative lens 52 permits the spacing between objective lens 38 and sample 18 to be increased somewhat and also requires that the spacing between negative lens 52 and the retina of the viewer's eye be increased. The incorporation of negative lens 52 as described produces a number of surprising effects. Assuming that the microscope illustrated in FIG. 4 produces a magnification of 3000X in the wet cornea microscope configuration without the incorporation of negative lens 52, a magnification of 10,000X can be readily obtained by merely adding a weak negative lens 52 in the position illustrated. The addition of lens 52 requires that the vertical position of microscope barrel 14 to be moved upward, which produces the desirable affect of increasing the spacing between sample 18 and lower objective lens 38. Increased spacing between sample 18 and objective lens 38 is highly desirable when sample 18 has a substantial vertical thickness. The FIG. 4 embodiment has also been shown having a plurality of objective lenses merely for the purpose of illustration. The wet cornea microscope of the present invention can be utilized with many different types of optical microscope systems as has already been described. The embodiment illustrated in FIG. 4 also may include a vertically displaceable eyepiece 54 which may be desirable in certain microscope systems.

It will be apparent to those skilled in the art that the disclosed wet cornea microscope may be modified in numerous other ways and may assume many embodiments other than the preferred forms specifically set out and described above. For example, various other forms of fluid-filled chamber means other than the specific types of eyepieces described above could readily be incorporated in the wet cornea microscope. As has already been stated, various different types of either single or multi-element objective lens systems can be incorporated within the wet cornea microscope. Accordingly, it is intended by the appended claims to cover all such modifications of the present invention which fall within the true spirit and scope of the invention.

I claim:

1. A wet cornea microscope for enabling a viewer to see a substantially magnified image of a sample, comprising:

a. a microscope barrel having a hollow tubular interior and first and second ends;
b. an objective lens coupled to the first end of said barrel and positionable in close proximity to the sample; and
c. means, including flat, optically transparent, non-refractive window means, positionable in alignment with the second end of said barrel for forming an optically transparent, fluid-filled chamber around the cornea of one of the viewer's eyes;

whereby said fluid-filled chamber means effectively eliminates the refractive effect of the cornea aqueous humor interface in the viewer's eye and permits said microscope to form a substantially magnified image of the sample on the retina of the viewer's eye.

2. The wet cornea microscope of claim 1 wherein the index of refraction of the fluid within said fluid-filled chamber means is substantially equal to the index of refraction of the fluid within the aqueous humor of the viewer's eye.

3. The wet cornea microscope of claim 2 wherein the fluid within said fluid filled chamber means includes a solution of sugar and water.

4. The wet cornea microscope of claim 2 wherein the fluid within said fluid filled chamber means includes a saline solution.

5. The wet cornea microscope of claim 1 wherein said fluid-filled chamber means includes a fluid-filled eyepiece coupled to the face of the viewer.

6. The wet cornea microscope of claim 5 wherein said fluid-filled eyepiece surrounds a single eye of the viewer.

7. The wet cornea microscope of claim 1 wherein said objective lens is a positive lens.

8. The wet cornea microscope of claim 1 further including a second objective lens positioned in alignment with and in proximity to said objective lens within said microscope barrel.

9. The wet cornea microscope of claim 1 further including a negative lens coupled to the second end of said microscope barrel.

10. The wet cornea microscope of claim 1 further including a positive lens coupled to the second end of said microscope barrel.

11. The wet cornea microscope of claim 1 wherein said objective lens forms a water tight seal with the first end of said barrel and comprises said window of said fluid-filled chamber means, wherein the interior of said barrel is filled with fluid, and wherein said fluid-filled chamber means includes a fluid-filled eyepiece coupled to the second end of said barrel.

12. A wet cornea microscope for enabling the viewer to see a substantially magnified image of a sample comprising:
a. a microscope barrel having a hollow tubular interior and first and second ends;
b. an objective lens coupled to the first end of said barrel and positionable in close proximity to the sample;
c. a fluid-filled eyepiece adapted to contact the face of the viewer, including a flat, optically transparent, non-refractive window, for forming an optically transparent, fluid-filled chamber around the cornea of one of the viewer's eyes, the index of refraction of the fluid within said eyepiece being substantially equal to the index of refraction of the aqueous humor of the viewer's eye;

whereby the contact of the fluid within said chamber with the cornea of the viewer's eye effectively eliminates the refractive effect of the cornea/aqueous humor interface in the viewer's eye and permits said microscope to form a substantially magnified image of the sample on the retina of the viewer's eye.

13. The wet cornea microscope of claim 12 further including a negative lens coupled to the second end of said barrel.

14. The wet cornea microscope of claim 12 further including means coupled to said eyepiece and to said viewer for maintaining the eyepiece in a fixed position on the face of the viewer.

15. The wet cornea microscope of claim 14 wherein said eyepiece maintaining means includes a strap having a first end coupled to one side of said eyepiece and a second end coupled to the other side of said eyepiece.

16. The wet cornea microscope of claim 12 wherein the second end of said barrel includes a negative lens for causing the light rays traveling through said eyepiece to converge less steeply.

17. The wet cornea microscope of claim 12 further including means for illuminating said sample.

18. A wet cornea microscope for enabling a viewer to see a substantially magnified image of a sample, comprising:
a. a microscope barrel having a hollow tubular interior and first and second ends;
b. an objective lens coupled to the first end of said barrel and positionable in close proximity to the sample; and
c. means including an optically transparent window positionable in alignment with the second end of said barrel for forming an optically transparent, fluid-filled chamber around the cornea of one of the viewer's eyes, said fluid-filled chamber means including a hollow tubular barrel having an outer diameter less than the inner diameter of said microscope barrel, said tubular barrel including first and second ends;

whereby said fluid-filled chamber means effectively eliminates the refractive effect of the cornea/aqueous humor interface in the viewer's eye and permits said microscope to form a substantially magnified image of the sample on the retina of the viewer's eye.

19. The wet cornea microscope of claim 18 wherein the interior of said tubular barrel is filled with a fluid having an index of refraction substantially equal to the index of refraction of the aqueous humor of the viewer's eye.

20. The wet cornea microscope of claim 18 wherein said optically transparent window is coupled to the first end of said barrel and wherein the second end of said tubular barrel includes a substantially enlarged fluid reservoir for forming a fluid-filled eyepiece for the viewer's eye.

21. The wet cornea microscope of claim 20 wherein said window is positioned in close proximity to said objective lens.

* * * * *